United States Patent
Mucci et al.

(10) Patent No.: US 10,068,077 B2
(45) Date of Patent: Sep. 4, 2018

(54) FALSE ALARM AVOIDANCE

(71) Applicants: Anthony Mucci, Wellington, FL (US); Michael Garavuso, Boca Raton, FL (US)

(72) Inventors: Anthony Mucci, Wellington, FL (US); Michael Garavuso, Boca Raton, FL (US)

(73) Assignee: Tyco Fire & Security GmbH, Neuhausen am Rheinfall ( * ) Notice: Subject to any disclaimer, the term of this patent is extended or adjusted under 35 U.S.C. 154(b) by 69 days.

(21) Appl. No.: 14/177,432

(22) Filed: Feb. 11, 2014

(65) Prior Publication Data

US 2015/0227734 A1 Aug. 13, 2015

(51) Int. Cl.
*G06F 21/32* (2013.01)
*H04W 12/06* (2009.01)
*G08B 13/196* (2006.01)

(52) U.S. Cl.
CPC ............ *G06F 21/32* (2013.01); *H04W 12/06* (2013.01); *G08B 13/19684* (2013.01)

(58) Field of Classification Search
CPC .... G06F 21/32; G06F 21/6218; H04W 12/00; G08B 13/19684
See application file for complete search history.

(56) References Cited

U.S. PATENT DOCUMENTS

| | | |
|---|---|---|
| 6,792,319 B1 | 9/2004 | Bilger |
| 6,909,921 B1 | 6/2005 | Bilger |
| 8,456,293 B1 * | 6/2013 | Trundle et al. ............... 340/517 |
| 9,141,150 B1 * | 9/2015 | Trundle ................. G06F 1/1694 |
| 2002/0174344 A1 * | 11/2002 | Ting ........................ G06F 21/32 713/185 |
| 2003/0023874 A1 * | 1/2003 | Prokupets ............... G06F 21/32 726/4 |
| 2006/0022816 A1 * | 2/2006 | Yukawa ............... G08B 25/006 340/521 |
| 2006/0026672 A1 * | 2/2006 | Braun .................. G05B 19/042 726/9 |

(Continued)

FOREIGN PATENT DOCUMENTS

WO WO 03/021538 3/2003

OTHER PUBLICATIONS

PCT International Search Report Written Report PCT/US2015/015348.
European Search Report, PCT./US2015/015348.

*Primary Examiner* — Meng Li
(74) *Attorney, Agent, or Firm* — Fish & Richardson P.C.

(57) ABSTRACT

Among other things, a system comprises a processor device, a memory in communication with the processor device, and a storage device that stores a program of computing instructions for execution by the processor using the memory. The program comprises instructions configured to cause the processor to receive from a user device biometric information of a user requesting access to the security system. The biometric information is associated with the user in possession of the user device. The processor is also caused to analyze the received biometric information to determine whether the user in possession of the device is a person authorized to access the security system with the user device. If the user is determined to be authorized, the user is allowed to access the security system.

16 Claims, 5 Drawing Sheets

(56) References Cited

U.S. PATENT DOCUMENTS

| | | |
|---|---|---|
| 2007/0198850 A1 | 8/2007 | Martin et al. |
| 2010/0321151 A1 | 12/2010 | Matsuura et al. |
| 2011/0047605 A1* | 2/2011 | Sontag .................... G06F 21/32 726/7 |
| 2012/0282974 A1 | 8/2012 | Green et al. |
| 2013/0076507 A1 | 3/2013 | Petricoin, Jr. |
| 2013/0227651 A1* | 8/2013 | Schultz et al. .................... 726/4 |
| 2014/0002236 A1 | 1/2014 | Pineau |
| 2014/0019768 A1* | 1/2014 | Pineau .................... G06F 21/32 713/186 |
| 2014/0218517 A1* | 8/2014 | Kim .................... H04L 12/2818 348/143 |
| 2014/0230018 A1* | 8/2014 | Anantharaman ... H04L 63/0861 726/4 |
| 2014/0266669 A1* | 9/2014 | Fadell .................... G05B 19/042 340/501 |

* cited by examiner

FALSE ALARM AVOIDANCE

BACKGROUND

This description relates to authenticating users for access to security systems.

It is common for businesses and homeowners to have a security system for detecting alarm and trouble conditions at their premises and signaling the conditions to a monitoring station or to authorized users of the security system. Generally, a user can access a security system to control the security system by directly interacting with hardware, e.g., a control panel, of the security system. For example, the user can enter a security code (or PIN) at the panel. Alternatively or additionally, the user can also access the security system through a user device that is registered with the security system, e.g., a portable handheld device. Such a handheld device can be mobile devices including smart phones, tablets, laptops, etc., that executes one or more applications to access/control the security system.

The user device can be local or remote relative to the security system and can interact with the security system through a network, e.g., a wired network or a wireless network. In particular, one or more software applications installed on the device and when the application(s) is executed, the application(s) can provide a user with access to the security system using the user device.

SUMMARY

According to an aspect, a system comprises a processor device, a memory in communication with the processor device, and a storage device that stores a program of computing instructions for execution by the processor using the memory. The program comprises instructions configured to cause the processor to receive from a user device biometric information of a user requesting access to the security system. The biometric information is associated with the user in possession of the user device. The processor is also caused to analyze the received biometric information to determine whether the user in possession of the device is a person authorized to access the security system with the user device. If the user is determined to be authorized, the user is allowed to access the security system.

The above techniques can include additional features and one or more of the following advantages. Security of access and control of a security system can be improved by implementing a user biometric authentication, alternative or in addition to other authentication methods. In a particular example, when a user accesses a security system through mobile devices, such as smart phones, tablets, etc., the user is authenticated biometrically as a person who is authorized to possess the mobile devices (e.g., as the owner of the mobile devices) and access the security system through the mobile devices. Unauthorized accesses to the security system by other persons who may be in possession of the mobile devices and possibly additional security codes are prevented. The software and hardware of the mobile devices can be conveniently used for obtaining the biometric information from the user. For example, the mobile devices may include cameras for taking photos of facial features for facial recognition, or microphones for recording voices for voice recognition. The access and control over a security system can be granted at different levels for different users based on the users' biometric authentications. For example, some users identified by their stored biometric information, once authenticated, can be granted with a greater level of control over the security system than other users also identified by their stored biometric information. In some implementations, the level of access and control over a security system can be tailored on a user-by-user basis.

The details of one or more embodiments of the invention are set forth in the accompanying drawings and the description below. Other features, objects, and advantages of the invention are apparent from the description and drawings, and from the claims.

DETAILED DESCRIPTION

In typical implementations, users are granted access to a security system only after they are authenticated, so that the security system is protected from unauthorized access. In a direct access implementation, a user interacts directly with the hardware of the security system, e.g., a control panel, and is typically required to enter a code in order to, e.g., to activate, deactivate, or change settings of the security system. In indirect access implementations, a user interacts with the security system through one or more applications installed on a user device. Typically, these applications allow the user to change settings, activate and de-activate, or take other actions with respect to the security system. To use the applications on the user device, a user may be required to input a security code (such as a PIN) to access the user device, e.g., to unlock the user device, and/or to enter another security code (or PIN) to access each or all applications. In addition, the user may be required to input yet another security code (or PIN) to take certain actions on the security system, such as arm or disarm the security system, through the applications.

As discussed below, in indirect access implementations, as an alternative to requiring the user to enter codes through the user device in order to access and control the security system, the user of the user device/applications is authenticated so that the user in possession of the device or running the application(s) is the person authorized to access the security system though that device and/or instance of the application(s).

The user is authenticated in various ways. One example is biometric authentication. For example, biometric information, such as facial features, voice features, finger print(s) of one or more users authorized to access a security system is stored in the system or in a remote server. When a user requests access, directly or indirectly, to the security system, in addition to or as an alternative to the above mentioned authentication processes, biometric information is received from the user and compared with the stored information to determine whether an authorization can be granted to the user for use in accessing the security system.

This user biometric authentication provides additional protection to the security system. For example, sometimes the user device (such as, but not limited to a mobile device) and the user's PIN may fall into the possession of an unauthorized person. Without being further authenticated, the unauthorized person may gain access to the security system based on the fact that they are in possession of the user device and PIN.

In another example, certain implementations of the security system, the application(s) and/or the user device may allow a user to choose to register the device once with the security system without requiring the user to enter any security code during later accesses after the user device is registered. The user may also be allowed to choose to register the application(s) with the device so that the user does not have to enter a PIN to run the application(s) on the registered device. Such settings are convenient for the user. However, the risk of unauthorized access to the security system becomes even higher because if some unauthorized person gains possession of an unlocked user device, the unauthorized person may access the security system without any PIN. The use of user biometric authentication, as described above, allows for accurate authentication of the person who is in possession of the device. Such a user biometric authentication can prevent unauthorized persons from accessing the security system, even if the unauthorized persons are in possession of the user device, application(s), and/or PIN for use in accessing the security system.

Figure 1:
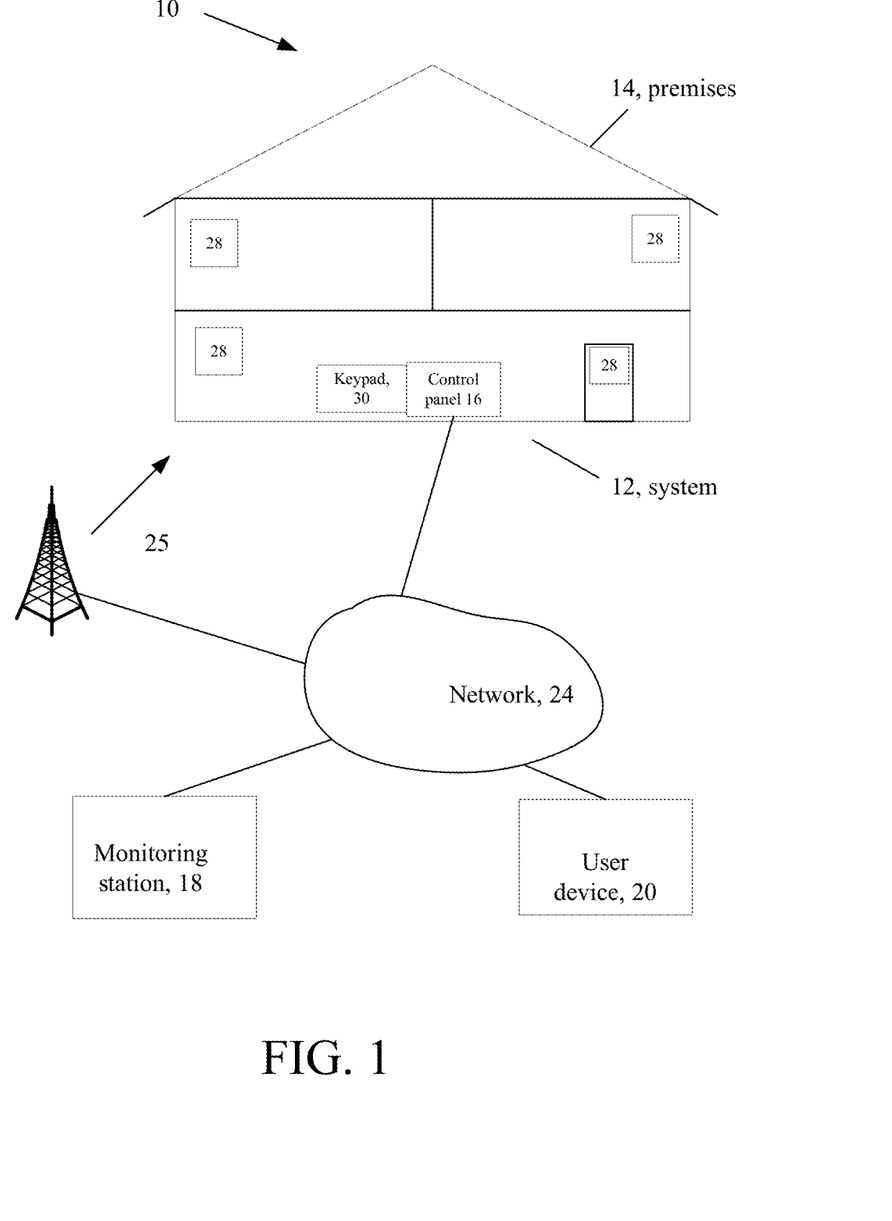
FIG. 1 is a schematic diagram of an example security system at a premises.

Referring now to FIG. 1 an example application 10 of a security system 12 at a premises 14 is shown. In this example the premises 14 is a residential house, but the premises may alternatively be any type of premises, e.g., commercial industrial, etc. The security system 12 includes a control panel 16, sensors/detectors 28 and a keypad 30. The security system 12 is in communication with a central monitoring station 18 and/or one or more authorized user devices 20 (only one shown) through one or more data networks 24 (only one shown), such as the Internet. The control panel 16 is in communication with one or more detectors 28 and receives information about the status of the monitored premises from the detectors 28. Examples of detectors 28 include motion detectors, glass break detectors, gas sensors, smoke/fire detectors, microphones, contact switches, and others. The detectors 28 may be hard wired to the control panel 16 or may communicate with the control panel 16 wirelessly. The detectors 28 may sense the presence of motion, glass breakage, gas leaks, fire, and/or breach of an entry point and send the sensed information to the control panel 16 and/or to the user device 20. Based on the information received from the detectors, the control panel 16 determines whether to trigger alarms, e.g., by triggering one or more sirens (not shown) at the premises 14 and/or sending alarm messages to the monitoring station 18 and/or to the user device 20.

A user may access the control panel 16 to control the security system, e.g., disarm the security system, arm the security system, enter predetermined standards for the control panel 16 to trigger the alarms, stop the alarms that have been triggered, add new or additional users, modify other user access settings/levels, view the monitoring status in real time, etc. The access can be made directly at the premises 14, e.g., through the keypad 30 connected to the control panel. In some implementations, the control panel 16 may also include a display (not shown) that shows a graphical user interface to assist a user's control of the security system. The display may be a touch screen such that the user may interact with the control panel and the security system directly through the display. The user may also access the control panel 16 through the user device 20, which can be at the premises 14 or remote from the device 14. To allow a user to access the control panel 16 through the user device 20, and to protect the security system from unauthorized accesses, the control panel 16, the monitoring center 18, and/or the user device implements one or more levels of authentication, including user biometric authentication.

The one or more levels of authentication are supported by software and hardware of the control panel 16, the monitoring station 18, and/or the user device 20, examples of which are discussed further below. The one or more levels of authentications can be implemented all at the same device or at different devices, which are also discussed further below.

The data network 24 may include any combination of wired and wireless links capable of carrying packet switched traffic, and may span multiple carriers, and a wide geography. In one embodiment, the data network 24 may simply be the public Internet. In another embodiment, the data network 24 may include one or more wireless links, and may include a wireless data network, e.g., with tower 25, such as a 2G, 3G, 4G or LTE cellular data network. The panel 16 may be in communication with the network 24 by way of Ethernet switch or router (not illustrated). The panel 16 may therefore include an Ethernet or similar interface, which may be wired or wireless. Further network components, such as access points, routers, switches, DSL modems, and the like possibly interconnecting the panel 16 with the data network 24 are not illustrated.

For a particular security system such as the security system shown in FIG. 1, only those users who are biometrically authenticated may gain access to the control panel 16 to control the security system. The users can be either users that access the security system via a user device or those that access the security system directly via the alarm panel as both the user device and the alarm panel can have, or are associated with, biometric authentication capabilities.

In some implementations, multiple users may be allowed to access the security system and control the security system at different authorization levels. The different authorization levels can correspond to different pre-defined sets of security system features the authorized users can enable. For example, there would be a different set of features presented to the head of security than is presented to the nightly cleaning staff. In another example, some users may only be allowed to arm the security system, but not to disarm the security system, some users may be allowed to both arm and disarm the security system, but not adjust other settings of the security system, and other users may be allowed to adjust the settings of the security system. Access to the security system at different levels may be granted based on the biometric authentication of the users.

The biometric authentication can be performed by a system that includes a processor device, a memory in communication with the processor device, and a storage device that stores a program of computing instructions for execution by the processor using the memory. Sometimes the storage device may be part of the memory. Such a system can be part of the control panel 16, the monitoring station 18, or the user device 20.

Figure 2:
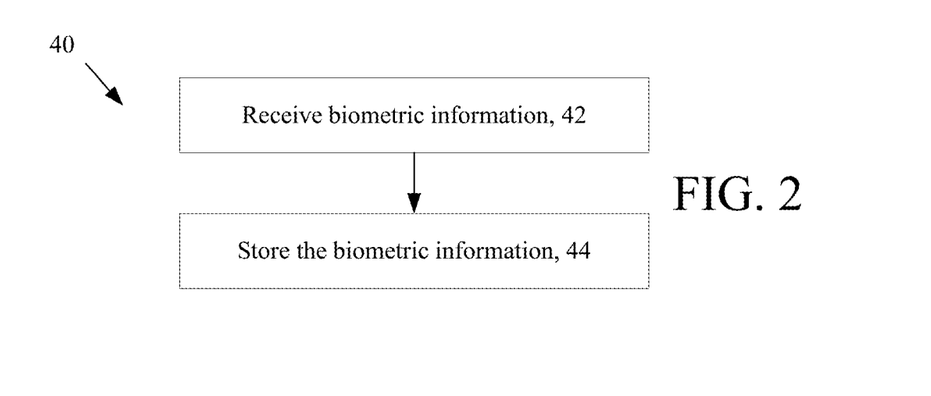
FIG. 2 is a flow diagram showing an example process of preparing a system for implementing biometric authentication.

Initially, the system is prepared for the biometric authentication in an example process 40 shown in FIG. 2. When an authorized user, e.g., an owner, first accesses a security system, e.g., during the setup of the security system or after the security system has been set up, the user is asked to provide biometric information to the system that performs the biometric authentication. The biometric information, such as facial features, voice features, fingerprints, retina scanning, etc., can be obtained directly by the system, e.g., using a camera, a recording device, or a scanner in connection with the system, or can be uploaded to the system in the form of photos, recordings, etc., through a wire connection or a wireless connection. After the system receives 42 the biometric information, the system stores 44 the biometric information. In some implementations, the system encrypts the received/stored biometric information for enhanced security.

The biometric information, whether encrypted or unencrypted, is stored in association with the security system. For example, a link is established between the biometric information and its corresponding security system. Such a link is implemented such that in use, a user is biometrically authenticated for access to the linked security system(s). In addition, the biometric information may be stored in association with other information of the user, such as name, address, or the user device(s) that the user typically would use to access the security system. Furthermore, the biometric information may be stored in connection with a level of authorization to a security system, representing how much control or access the user can be granted over the security system. Such a connection allows the system to grant the authorization with the stored level based on the biometric information of the user.

Additional users may be added to a particular security system so that multiple users may have access to the same security system, at the same authorization level or at different authorization levels.

Figure 3:
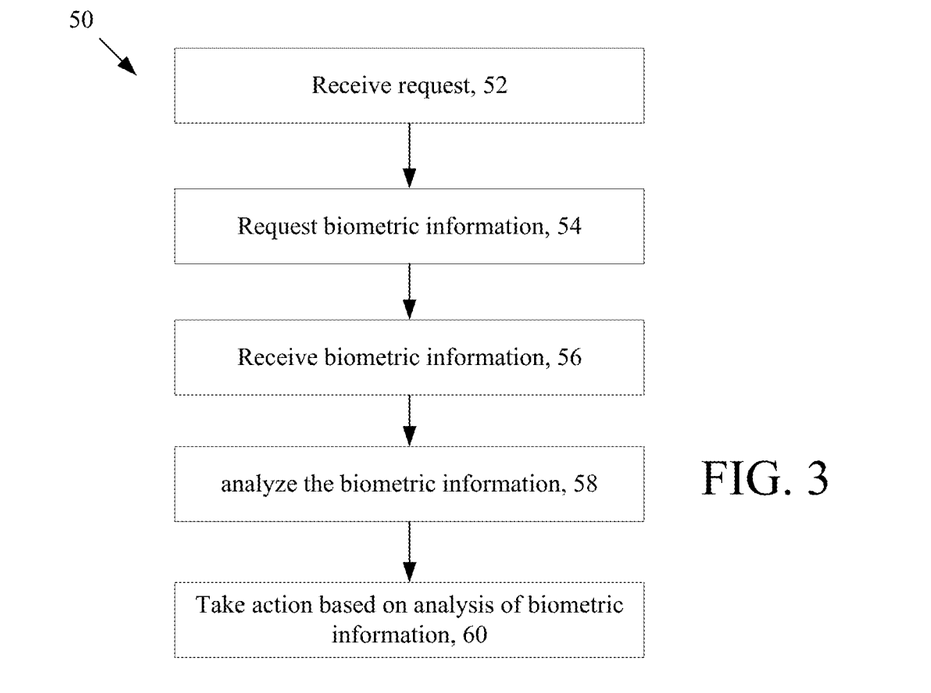
FIG. 3 is a flow diagram showing an example process of biometrically authenticating a user who requests access to a security system.

Referring to FIG. 3, a system authenticates a user in an example process 50. The system receives 52 a request, from the hardware of the security system or a user device that a user wants to access a security system. The system sends a request 54 to the user to submit biometric information. The type of biometric information may be one of the type(s) that the system has stored. Upon receiving 56 the requested biometric information, the system analyzes 58 the biometric information. Based on this analysis the system takes 60 further actions, such as to allowing or denying access, or requesting other information.

Figure 4:
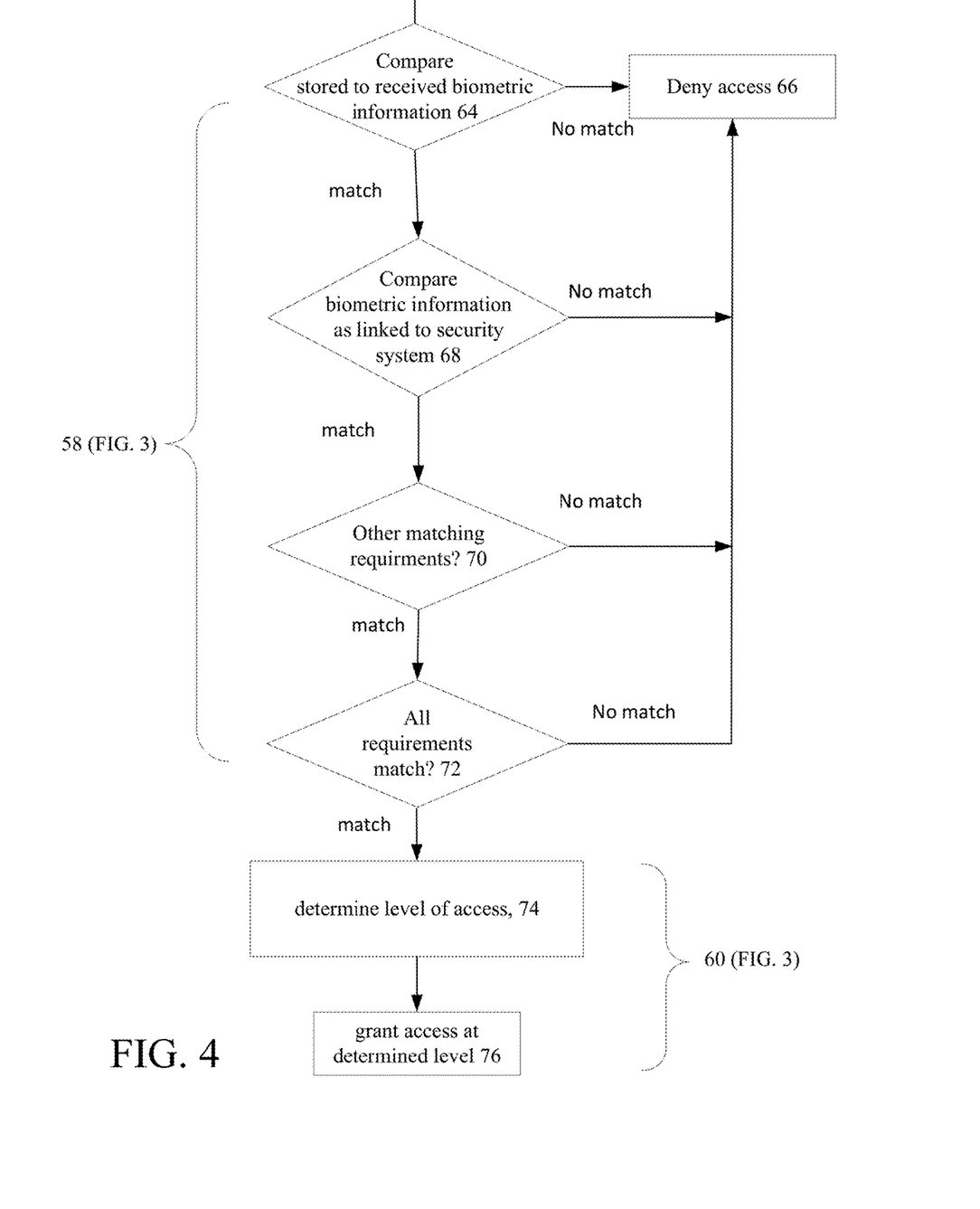
FIG. 4 is a flow diagram of an analysis process.

Referring now to FIG. 4, the analysis 58 of FIG. 3 can involve determining 64 whether there is a match between the stored biometric information and the received biometric information. If there is no match, the system for authentication denies 66 the user's request for accessing the security system. If there is a match, the system further determines 68 whether the security system stored as linked to the stored biometric information matches the security system the user requests to access. If not, then the system denies 66 the user's request for access. If there is a match, then the system determines 70 whether there are other matching requirements, such as user name, etc. If no, then the system skips the next determination step. If there are other matching requirements related to the biometric authentication, the system determines 72 whether all matching requirements are satisfied after all information needed for the matching is received. If no, then the system denies 66 the user's request for access. If yes, then the system determines 74 the level of authorization to be granted to the user. Once determined, the system grants 76 the authorization to the user to access the security system at the determined level.

In some implementations, the user may access the security system after receiving the granted authorization, e.g., from the process 50 of FIG. 3. In other implementations, the user may be required to gain additional authorizations and only all required authorizations are obtained, can the user be allowed to access the security system or perform particular control activities over the security system.

Examples of other authentications for use alone or in combination with the user biometric authentication to control user access and user control of the security system can include device authentication, application authentication, and activity authentication. Although authentications with security codes (or PINs) are discussed below, other authentication methods, including biometric authentications can also be used.

In addition to user authentication, a user device can be authenticated. For example, when a user device is used, such as the user device 20 of FIG. 1, to access and control a security system indirectly, the user device 20 can be authenticated in various ways.

For example, one or more user devices may be registered with the security system such that access from unregistered user devices is denied. The registered devices may be granted with an authorization for use in accessing the security system without additional security requirements. In some implementations, a user may be required to enter a security code (or PIN), e.g., assigned to the user device, even though the user is using a registered device to access the security system. The authentication of the user device can be performed by the control panel 16 and/or the monitoring station 18 that stores and receives authentication information from the user device 20 through the data network 24.

In addition, the registered devices may be locked such that a user needs to enter a security code to unlock the device before the device can be used for gaining access to the security system. This authentication process can be performed locally at the user device, which stores the security code (e.g., in its encrypted form) for matching a received security code.

One or more applications can be installed on a user device in association with a security system. To access the security system through the user device, a user executes the one or more applications after being granted authorization to do so. For example, before the application(s) is executed, the user is required to enter a security code. The entered security code can be authenticated locally at the user device 20, or remotely at the control panel 16 or the monitoring station 18. In some implementations, the application may be registered with the user device, such that when a user runs the application from the user device, the user does not have to input any security code.

After a user is granted access to a security system, he/she is allowed to initiate certain control activities through the input of control commands or codes directly at the premises or remotely through a user device. Each code corresponds to a type of control activity, such as arm, disarm, etc. The control panel 16 and/or the monitoring station 18 receiving a code can translate the code into the corresponding control activity and instructs the security system to perform the activity. For example, in order to disarm a security system, a user who has gained access to the security system, through biometric authentication with or without other authentications, needs to enter a code that corresponds to the action of disarming so that the security system can perform the action as instructed.

In some situations, not all control activities of a security system have corresponding codes. For example, the control panel 16 or the user device 20 may display options for control activities to a user once the user gains access to a security system. The user may control the security system by choosing and activating the selected control activity, e.g., by clicking or touching the choice on a screen of the control panel 16 or the user device 20.

As discussed previously, the user biometric authentication, alone or in combination with one or more of the other authentication processes can be implemented on one or more of the control panel 16, the user device 20, and the monitoring station 18, examples of which are discussed below in connection with FIGS. 5-8.

Figure 5:
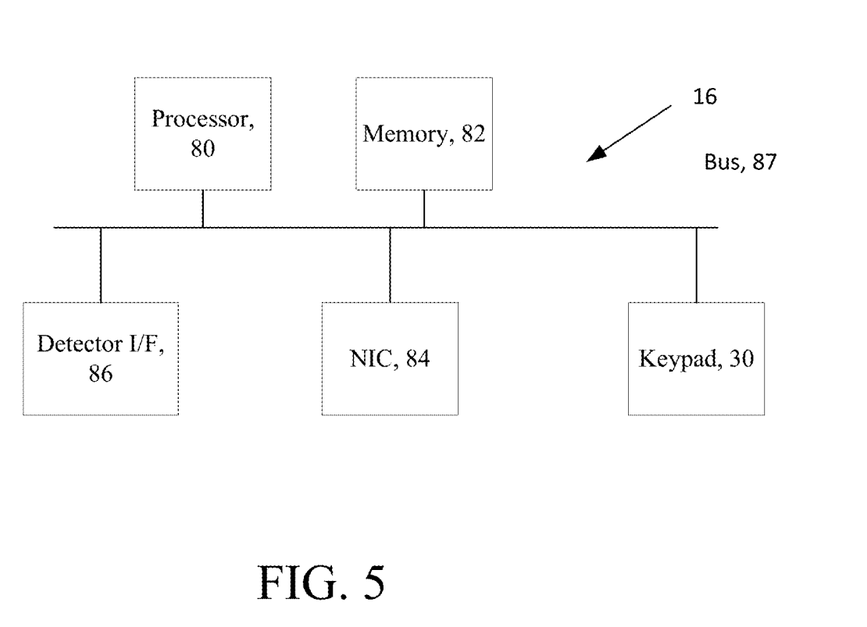
FIG. 5 is a schematic block diagram of an example control panel.

Referring now to FIG. 5, an example of a control panel 16 of FIG. 1 is shown. The control panel 16 includes a processor 80 in communication with memory 82, a detector interface 86 for communicating with detectors 28, and a network interface 84 for communicating with the data network 24 that are connected together via a bus 87 or the like. The keypad 30 can form part of panel 16 to allow entry of codes, e.g., for arming or disarming the security system. The control panel 16 may also include other components (not shown), such as a speaker, power supply, LCD/LED display and the like. Optionally, the panel 16 may include tamper sensors, and a back-up power supply such as a battery, allowing the panel to operate even if the system loses power or has been physically removed from where the control panel was mounted. Further, the panel 16 may allow for two-way voice communication between the premises 14 and the monitoring station 18 and/or between the premises 14 and one or more user devices 28.

The memory 82 stores program instructions and data used by the processor 80 of the control panel 16. The memory 82 may be a suitable combination of random access memory and read-only memory, and may host suitable program instructions (e.g. firmware or operating software), and configuration and operating data and may be organized as a file system or otherwise. The stored program instruction may include one or more authentication processes for authenticating one or more users by the control panel 16 before granting the users with accesses to a security system that includes the control panel 16. The configuration and operating data may include data for use in the one or more authentication processes (or authentication data), e.g., encrypted or unencrypted biometric data of those users who are authorized to access the security system, encrypted or unencrypted security codes set by the authorized users, etc. In some implementations, the memory 82 only stores authentication data for the security system to which the memory 82 belongs. In some implementations, the control panel 80 also includes a storage device that stores a database (not shown) containing the authentication data, and the memory and the processor can access the database to retrieve necessary authentication data for performing the authentication processes. Alternatively or in addition, the authentication data may be stored external to the control panel 16, e.g., at the monitoring station 18 or other locations, such that when the control panel 16 authenticates a user, the control panel retrieves the necessary authentication data externally.

The program instructions stored in the memory 82 of the panel 16 may further store software components allowing network communications and establishment of connections to the data network 24. The software components may, for example, include an internet protocol (IP) stack, as well as driver components for the various interface, including the interfaces 84 and 86 and the keypad 30. Other software components suitable for establishing a connection and communicating across network 24 will be apparent to those of ordinary skill.

Program instructions stored in the memory 82 of the control panel 16, along with configuration data may control overall operation of the panel 16. In particular, program instructions control how the panel 16 may grant a user with a certain level of access to a security system, how the panel 16 may be transitioned between its armed and disarmed states, and how the panel 16 reacts to sensing a condition at a detector 28 that may signify an alarm. Moreover, one or more data network addresses for signaling alarm conditions may be stored in the memory 82 of the control panel 16. These network addresses may include the network addresses (e.g. IP) by which the monitoring station 18 may be reached. Example control panels may comprise DSC® models PC1864 and PC9155, SCW915x suitably modified to operate as described herein.

An example monitoring station 18 is shown in FIG. 5. The monitoring station 18 is depicted as a single physical monitoring station or center in FIG. 1. However, it could alternatively be formed of multiple monitoring centers/stations, each at a different physical location, and each in communication with the data network 24. The central monitoring station 18 includes one or more monitoring server(s) 90 each processing messages from the panels 16 and/or user devices 20 of subscribers serviced by the monitoring station 18. Optionally, a monitoring server 90 may also take part in two-way audio communications or otherwise communicate over the network 24, with a suitably equipped interconnected panel 16 and/or user device 20.

Figure 6:
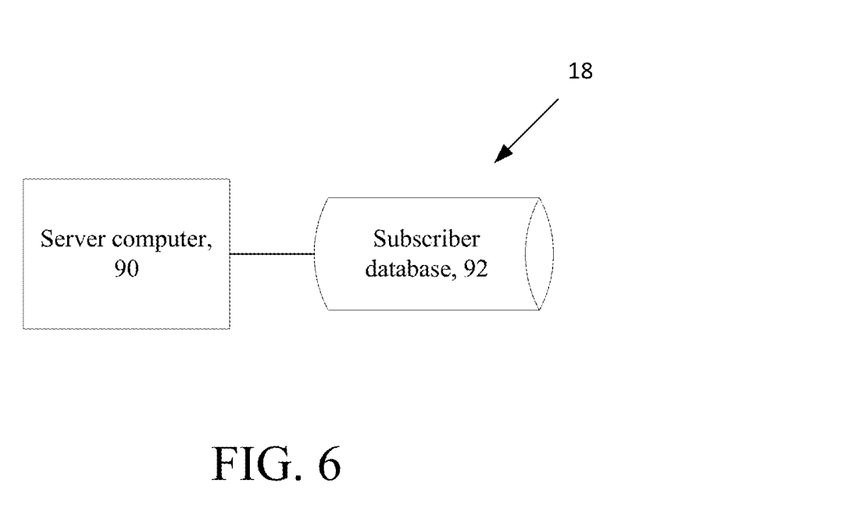
FIG. 6 is a schematic block diagram showing part of an example monitoring station.

The monitoring server 90 may include a processor, a network interface and a memory (not shown). The monitoring server 90 may physically take the form of a rack mounted card and may be in communication with one or more operator terminals. An example monitoring server 90 is a SURGARD™ SG-System III Virtual, or similar receiver.

The processor of each monitoring server 90 acts as a controller for each monitoring server 90, and is in communication with, and controls overall operation, of each server 90. The processor may include, or be in communication with the memory that stores processor executable instructions controlling the overall operation of the monitoring server 90. Suitable software enabling each monitoring server 90 to authenticate users for different security systems or to perform other functions may be stored within the memory of each monitoring server 90. Software may include a suitable Internet protocol (IP) stack and applications/clients.

Each monitoring server 90 of central monitoring station 18 may be associated with an IP address and port(s) by which it communicates with the control panels 16 and/or the user devices 20, e.g., to authenticate users, to handle alarm events, etc. This IP address may be static, and thus always identify a particular one of monitoring server 90 to the computing devices, panels, etc. communicating over the network 24. Alternatively, the dynamic addresses could be used, and associated with static domain names, resolved through a domain name service. The network interface may be a conventional network interface that interfaces with the network 24 (FIG. 1) to receive incoming signals, and may for example take the form of an Ethernet network interface card (NIC). The operating terminal(s) may be computers, thin-clients, or the like, to which received data representative of an alarm event is passed for handling by human operators. Each terminal may include a monitor, a keyboard, microphone, and an audio transducer/speaker. An operator, at the terminal may further be able to establish outgoing telephone calls, to the police or third party security personnel. To that end, the terminal may be proximate a PSTN telephone, or may include or have access to voice-over-IP software (running at the server 90, or elsewhere) allowing establishment of outgoing telephone calls to parties associated with the premises 14 (as identified in database 92), third parties, such as police, security personnel, or the like.

The monitoring station 18 may further include, or have access to, a subscriber database 92 that includes a database under control of a database engine. The database 92 may contain entries corresponding to the various subscribers to panels like the panel 16 that are serviced by the monitoring station 18. For example, the entries may contain user information, including authentication data, the names and addresses, phone number, contact phone number, for each subscriber. The database 92 may also include the particulars of each detector 28 of a security system, the unique identifier of each panel 16 assigned to a particular subscriber, account information, and the like. In addition, authentication data, control activities, and/or alarm data received from the panel 16 may be logged or archived in the database 92. In some implementations, the data can be sorted and stored based on its association with different panels 16 or different security systems.

Figure 7A:
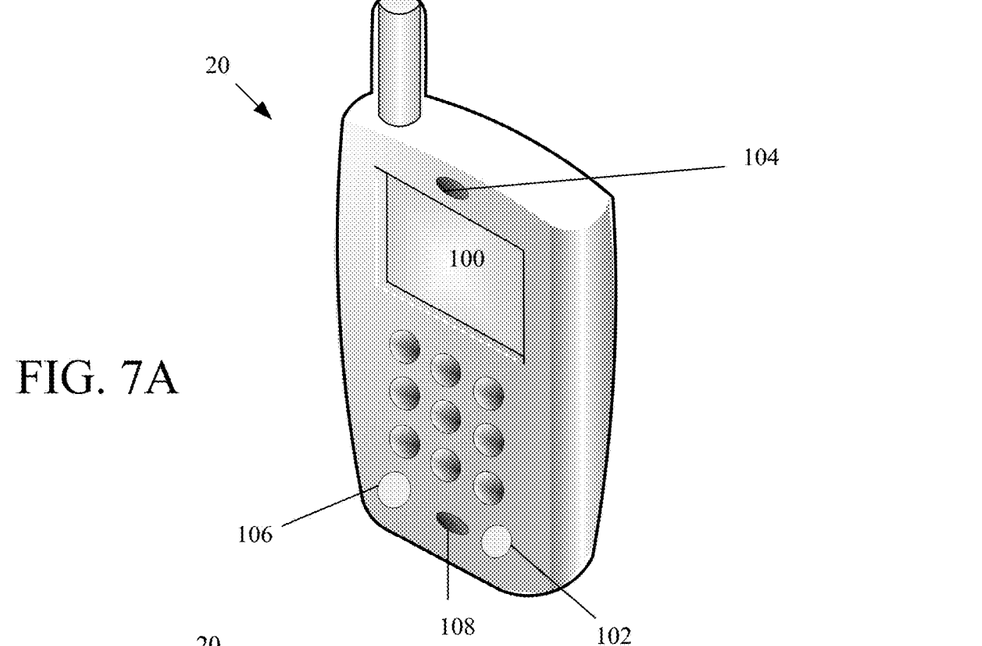
FIGS. 7A and 7B are schematic block diagrams showing an example user device.

Referring to FIG. 7A, an example user device 20 includes a display 100 and a keypad 102. In some implementations, the user device 20 is a smart phone. The keypad 102 may be a physical pad, or may be a virtual pad displayed in part of the display 100. A user may interact with the application(s) run on the user device 20 through the keypad 102 and the display 100. The user device 20 also includes a camera 104, a speaker phone 106, and a microphone 108. A user can use the camera 104 to take facial pictures and submit the pictures as biometric information. The user can also use the microphone 108 to record voice features and submit the voice features as biometric information.

Figure 7B:
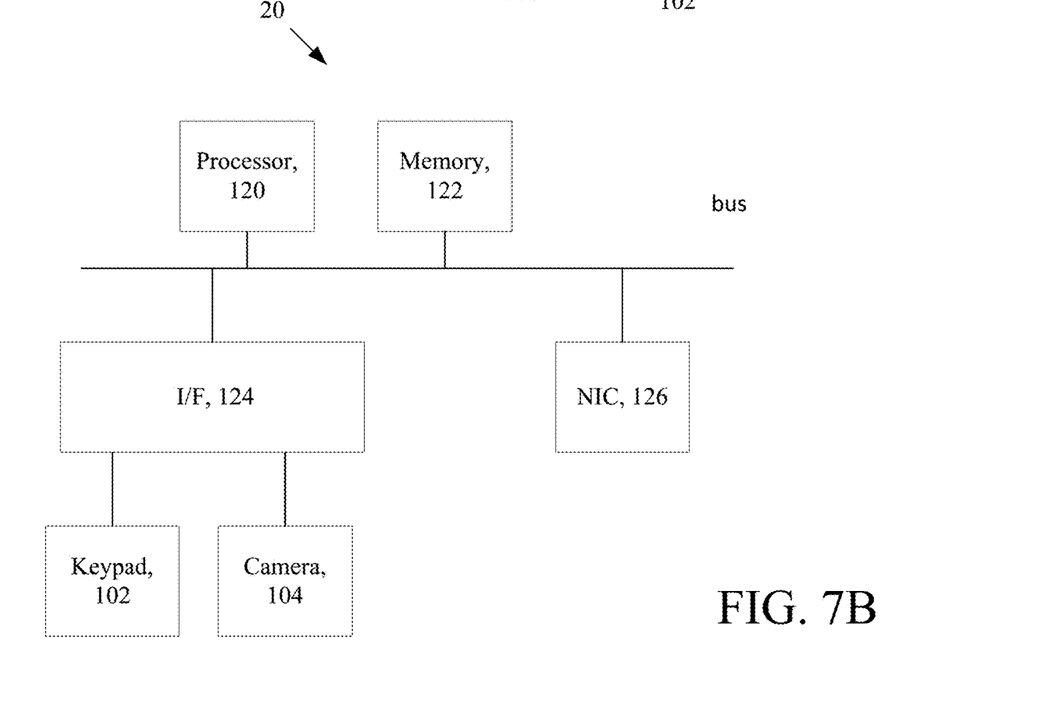

Structurally, referring also to FIG. 7B, the example user device 20 of FIG. 7A also includes a processor 120 for executing software instructions and perform functions, such as the user device's original intended functions, such as cell phone calls, Internet browsing, etc., and additional functions such as user authentication processes for a security system. A memory 122 of the user device 20 stores the software instructions and/or operational data associated with executing the software instructions. Optionally, the instructions and the data may also be stored in a storage device (not shown) of the user device 20. The user device 20 also includes one or more device interfaces 124 that provide connections among the different elements, such as the camera 104, the display 100, the keypad 102, the processor 120, the memory 122, etc., of the user device 20. The user device further includes one or more network interfaces 126 for communicating with external network(s), such as the network 24 of FIG. 1, and other devices.

Although certain embodiments of the methods and systems are described, variations can be included into these embodiments, or other embodiments can also be used.

Other embodiments are within the scope of the following claims.

What is claimed is:

1. A central monitoring system comprising:
 a subscriber database under control of a database engine, the subscriber database including entries corresponding to plural subscriber control panels in physical proximity to and associated with corresponding plural security systems monitored by the central monitoring system station;
 one or more server computer systems in communication with the subscriber database that are configured to cause the central monitoring system to:
  receive from a user device that is registered with a particular one of the plural security systems, a request to control the particular security system, with the request specifying one or more control actions to perform on a given one of the plural subscriber control panels, which corresponds to the particular one of the plural security systems;
  send a request to the user device to acquire user biometric information, the request specifying a particular live action for the user to perform on the given one of the plural subscriber control panels using the registered user device;
  receive from the user device, the acquired biometric information of the user in current possession of the registered user device;
  retrieve from the subscriber database stored authentication information including biometric information for a registered user that the central monitoring system has associated with the registered user device, and associated with the particular security system by the central monitoring system;
  analyze the received biometric information of the user in current possession of the user device and the retrieved stored authentication information to determine whether there is a match between the retrieved biometric information and the received biometric information, and when there is a match,
   determine whether a security system that is linked to the stored biometric information matches the particular security system the user requests to access;
   determine a level of access to the security system that is linked to the stored biometric information; and
  grant access from the user device to the security system that is linked to the stored biometric information, when the central monitoring system determines based on the determined level of access that the user is authorized to perform the specified one or more control actions from the user device to access the security system that is linked to the stored biometric information.

2. The system of claim 1, wherein the biometric information comprises facial features and analyzing the received biometric information comprises a facial recognition analysis.

3. The system of claim 1, wherein the biometric information comprises voice features and analyzing the received biometric information comprises a voice recognition analysis.

4. The system of claim 1, wherein the biometric information comprises one or more fingerprints and analyzing the received biometric information comprises a figure print analysis.

5. The system of claim 1, wherein the instructions to analyze the received biometric information comprises instructions to compare the received biometric information with biometric information of authorized users that is stored in a database.

6. The system of claim 1, wherein the user device is a mobile device.

7. The system of claim 1, wherein the processor is further configured to:
 determine the level of authorization to be granted to the user based on the determined level of access; and send a message to the security system that is linked to the stored biometric information to cause the security system linked to the stored biometric information to grant the user the determined level of access.

8. The system of claim 7, wherein said determined level of access includes a predetermined set of actions that the user is allowed to initiate on the security system that is linked to the stored biometric information.

9. The system of claim 1, wherein the system comprising the processor device, the memory, and the storage device is part of the system that is physically remote to the security system that is linked to the stored biometric information.

10. The system of claim 7 wherein the user device is a mobile user device.

11. The system of claim 1, wherein the system comprising the processor device, the memory, and the storage device is in communication with multiple security systems including the particular security system, and the system grants the user access to the security system that is linked to the stored biometric information, which is one of the multiple security systems.

12. A method executed by a remote server system including a subscriber database under control of a database engine, the subscriber database including entries corresponding to plural subscriber control panels in physical proximity to and associated with plural security systems that are serviced by the central monitoring station, the method comprising:
  receiving by the remote server system from a user device registered with a particular security system, a user request to execute a security system control action, with the user request specifying one or more control actions on a given one of the plural subscriber control panels, which corresponds to the particular one of the plural security systems;
  sending by the remote server system a request to the user device to acquire user biometric information, the request specifying a particular live action for the user to perform on the given one of the plural subscriber control panels using the registered user device;
  receiving by the remote server system from the user device, the acquired biometric information of the user in current possession of the registered user device;
  retrieving by the remote server system from the subscriber database, stored authentication information including biometric information for a registered user that the remote server system has associated with the registered user device, and associated with the particular security system by the remote server system;
  analyzing, by the remote server system the received biometric information of the user in current possession of the user device and the retrieved stored authentication information to determine whether there is a match between the retrieved biometric information and the received biometric information and when there is a match,
    determining by the remote server system whether a security system that is linked to the stored biometric information matches the particular security system the user requests to access;
    determine by the remote sever system a level of access to the security system that is linked to the stored biometric information; and
  granting by the remote sever system access from the user device to the security system that is linked to the stored biometric information, when the system determines based on the determined level of access that the user is authorized to perform the specified one or more control actions from the user device to access the security system that is linked to the stored biometric information.

13. The method of claim 12, wherein the biometric information comprises facial features and analyzing the received biometric information comprises a facial recognition analysis.

14. The method of claim 12, wherein the biometric information comprises voice features and analyzing the received biometric information comprises a voice recognition analysis.

15. The system of claim 1, wherein the processor is further configured to:
  determine the level of authorization to be granted to the user based on the determined level of access;
  send a message to the security system that is linked to the stored biometric information that causes the security system that is linked to the stored biometric information to grant the user the determined level of access from a mobile user device.

16. The method of claim 12 further comprising:
  determining by the remote server the level of authorization to be granted to the user based on the determined level of access;
  sending by the remote server, a message to the security system that is linked to the stored biometric information that causes the security system that is linked to the stored biometric information to grant the user the determined level of access from a mobile user device.

* * * * *

UNITED STATES PATENT AND TRADEMARK OFFICE
CERTIFICATE OF CORRECTION

PATENT NO. : 10,068,077 B2
APPLICATION NO. : 14/177432
DATED : September 4, 2018
INVENTOR(S) : Anthony Mucci and Michael Garavuso It is certified that error appears in the above-identified patent and that said Letters Patent is hereby corrected as shown below:

On the Title Page

Item (54) and in the Specification, title should read: METHOD AND APPARATUS FOR AUTHENTICATING SECURITY SYSTEM USERS AND UNLOCKING SELECTED FEATURE SETS

Signed and Sealed this
Thirtieth Day of October, 2018

Andrei Iancu
*Director of the United States Patent and Trademark Office*